(12) United States Patent
Drews et al.

(10) Patent No.: US 8,119,295 B2
(45) Date of Patent: Feb. 21, 2012

(54) METAL OXYGEN BATTERY CONTAINING OXYGEN STORAGE MATERIALS

(75) Inventors: Andrew Robert Drews, Ann Arbor, MI (US); Andrea Pulskamp, Plymouth, MI (US); Jun Yang, Ann Arbor, MI (US); Shinichi Hirano, West Bloomfield, MI (US); Michael Alan Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/828,752

(22) Filed: Jul. 1, 2010

(65) Prior Publication Data

US 2011/0143173 A1    Jun. 16, 2011

(51) Int. Cl.
*H01M 12/08* (2006.01)
(52) U.S. Cl. ............... 429/405; 429/59; 429/407
(58) Field of Classification Search .............. 429/59, 429/60, 101, 405, 407
See application file for complete search history.

(56) References Cited

U.S. PATENT DOCUMENTS

| | | | |
|---|---|---|---|
| 4,105,830 A * | 8/1978 | Kordesch ............... | 429/405 |
| 4,369,235 A | 1/1983 | Bursell | |
| 4,482,618 A | 11/1984 | Orsino et al. | |
| 4,762,978 A | 8/1988 | Tanis | |
| 6,238,821 B1 | 5/2001 | Mukherjee et al. | |
| 6,280,871 B1 | 8/2001 | Tosco et al. | |
| 6,372,370 B1 | 4/2002 | Kaplan et al. | |
| 6,599,655 B2 | 7/2003 | Johnson et al. | |
| 7,070,882 B1 | 7/2006 | Ferrando | |
| 7,147,967 B1 | 12/2006 | Read | |
| 7,198,867 B2 * | 4/2007 | Sanders ................... | 429/218.2 |
| 7,309,380 B2 | 12/2007 | Muller et al. | |
| 7,481,866 B2 | 1/2009 | MacGillivray et al. | |
| 7,517,396 B2 | 4/2009 | Arnold et al. | |
| 7,553,352 B2 | 6/2009 | Mueller et al. | |
| 2003/0075643 A1 | 4/2003 | Dunn | |
| 2003/0170516 A1 | 9/2003 | Prerad | |
| 2005/0287421 A1 | 12/2005 | Simon et al. | |
| 2006/0292434 A1 | 12/2006 | Hampden-Smith et al. | |
| 2007/0141431 A1 * | 6/2007 | Wang et al. ............ | 429/34 |
| 2008/0299456 A1 | 12/2008 | Shiga et al. | |
| 2009/0123811 A1 * | 5/2009 | Baumann et al. ....... | 429/34 |
| 2009/0239132 A1 | 9/2009 | Johnson | |
| 2010/0151336 A1 | 6/2010 | Nakanishi | |

FOREIGN PATENT DOCUMENTS

| | | | |
|---|---|---|---|
| JP | 2006-221993 | * | 8/2006 |
| JP | 2009-230985 | * | 10/2009 |
| WO | 99/60654 | | 11/1999 |

OTHER PUBLICATIONS

C. Combelles et al., Structural, Magnetic and Redox Properties of a New Cathode Material for Li-ion Batteries; The Iron-based Metal Organic Framework, Ionics, Abstract, vol. 14, No. 4, Jul. 2008, pp. 279-283.
M. Mirzaeian et al., Preparation of Controlled Porosity Carbon Aerogels for Energy Storage in Rechargeable Lithium Oxygen Batteries, Electrochimica Acta 54, (2009), pp. 7444-7451.

* cited by examiner

*Primary Examiner* — Stephen J. Kalafut
(74) *Attorney, Agent, or Firm* — Damian Porcari; Brooks Kushman P.C.

(57) ABSTRACT

A battery system includes a metal oxygen battery. The metal oxygen battery includes a first electrode, an oxygen storage material, and a selective transport member separating the oxygen storage material and the first electrode.

20 Claims, 4 Drawing Sheets

METAL OXYGEN BATTERY CONTAINING OXYGEN STORAGE MATERIALS

BACKGROUND

1. Technical Field

One or more embodiments of the present invention relate to oxygen storage materials as a source of oxygen for metal oxygen batteries and their method of use.

2. Background Art

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

SUMMARY

A battery system includes a metal oxygen battery. The metal oxygen battery includes a first electrode, an oxygen storage material, and a selective transport member separating the oxygen storage material and the first electrode.

In another embodiment, a battery system is disclosed. The system includes a metal oxygen battery including a first electrode, an oxygen storage material, and a second electrode including a metal material (M). The oxygen storage material contacts the first electrode such that oxygen communicates from the oxygen storage material to the first electrode.

In yet another embodiment, a method of operating a battery system is disclosed. The method includes the steps of inputting oxygen into a metal oxygen battery (MOB) having an oxygen containment unit internal to the MOB. The oxygen containment unit includes an OSM, which is contained within an electrolyte-impermeable membrane. The method further includes outputting oxygen to the OSM from the reversible closed-loop conduit.

DETAILED DESCRIPTION

Reference will now be made in detail to embodiments of compositions, structures, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

Electrochemical battery cells can include numerous configurations and chemistries, including primary or non-rechargeable battery cells and secondary or rechargeable battery cells. Non-limiting examples of a secondary battery cell include a lithium ion cell, a metal hydride cell, a metal-air battery cell, and a metal-oxygen battery cell. In general, a secondary battery cell is capable of storing electrical energy chemically, and the chemical storage often involves a reversible redox reaction. In the uncharged state, the redox reaction does not start spontaneously, and, in such cases, the secondary battery cell needs to be charged initially in order to store energy.

In one example of a secondary battery cell, a lithium ion cell includes a layered oxide positive electrode including lithium in ionic communication with a graphite negative electrode through a non-aqueous electrolyte and a separator. During charging, lithium is ionized from the layered oxide positive electrode and migrates through the electrolyte and separator to the negative electrode and becomes embedded in the porous negative electrode composition by the process of intercalation. During a discharge half step, the intercalation composition decomposes allowing current to flow within the battery cell by the movement of lithium ions from the negative electrode to the positive electrode.

In another example of a secondary battery cell, the metal hydride battery cell includes a metal oxyhydroxide positive electrode, such as a nickel oxyhydroxide, electrically communicating with a metal alloy negative electrode. The metal alloy negative electrode is a hydrogen storage alloy negative electrode. The hydrogen storage alloy includes a material reversibly forming a mixture of metal hydride compounds. In certain instances, the hydrogen storage alloy includes an intermetallic material having two or more solid phase metallic elements.

In yet another example of a secondary battery cell, a metal air battery cell is, in typical configurations, an open system with respect to material flow, heat transfer, and work. For instance, a metal air battery cell is provided with holes, openings, or vents, which mediate air transport between the metal air battery and atmospheric air. For most metal air batteries, moisture and interfering gases from the air often need to be filtered, eliminated, or trapped prior to the air's being introduced to the metal air battery. For instance, the metal air battery cell includes an air positive electrode communicating with a metal negative electrode electrically through a load, and ionically through an electrolyte and a separator. The air positive electrode, in typical configurations, includes a carbon based positive electrode. During the charge reaction, oxygen is released to the ambient air.

Metal oxygen batteries (MOBs) are conventionally characterized as a subgroup of the metal air batteries as oxygen is commonly involved for the electrochemical reactions. MOBs are known to have relatively high electrochemical capacities, and are therefore of great interest for applications where the total mass of a given battery is limited. Implementation of conventional MOBs has been met with difficulties in that their performance, both in terms of capacity and power, has been largely unsatisfactory. The limited performance is believed to be at least in part associated with incomplete or slow reactions involving the arrival and diffusion of oxygen molecules. For an MOB to achieve its full discharge capacity, sufficient quantities of oxygen must be made available in a timely manner. In addition, since the rate of discharging is tied to the formation and growth of the positive electrode oxide, the battery's rate of discharging at least in part depends on the more rate limiting processes of oxygen diffusion.

In one or more embodiments, the term metal oxygen battery (MOB) refers to a battery structure that differs from conventional metal oxygen/air batteries at least in that the MOB is relatively closed to atmospheric air and oxygen for reactions is relatively devoid of unwanted species such as nitrogen or carbon dioxide.

Figure 1:
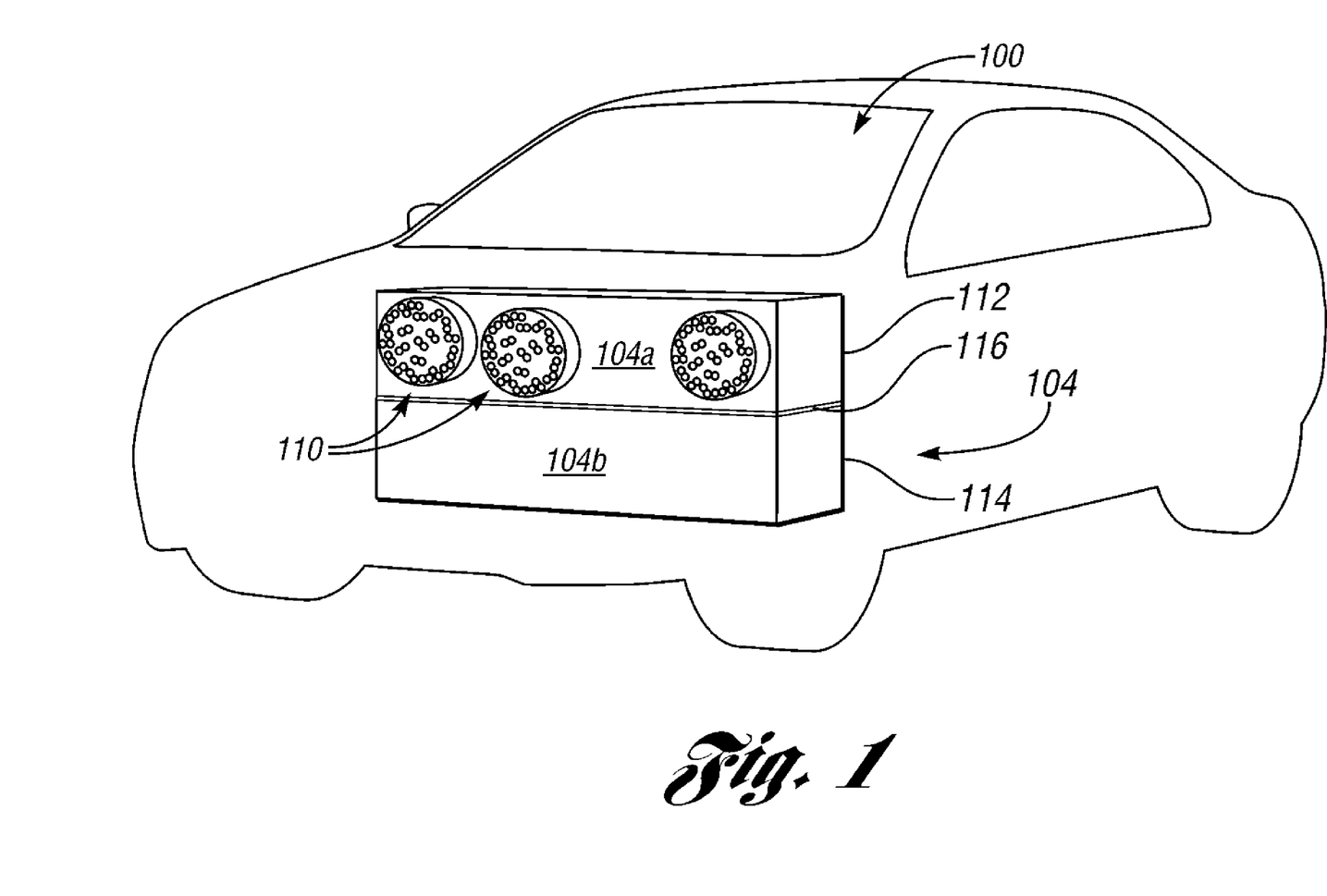
FIG. 1 depicts an illustrative view of a battery system for use in a vehicle according to one embodiment.

According to one aspect of the present invention, a battery system is provided. In one embodiment, and as depicted in FIG. 1, a battery system generally shown at 100 includes a metal oxygen battery 104 having a first electrode 104a and a second electrode 104b, the second electrode 104b including a metal material M (not shown). An oxygen storage material 110 is disposed within the metal oxygen battery 104. In certain instances, the metal oxygen battery 104 further includes a separator 116 defining a first electrode compartment 112 including the first electrode 104a and a second electrode compartment 114 including the second electrode 104b. In this configuration, the oxygen storage material 110 is disposed within the first electrode compartment 112 and communicates oxygen 108 to and from the first electrode 104a.

In certain instances, the oxygen storage material 110 is in fluid communication with the metal oxygen battery 104, and in certain particular instances the fluid is oxygen.

In one or more embodiments, the term "electrode" may refer to a structure through which charges are carried by electromotive force. Electrodes may be composed of one or more metal and/or semiconductor. Electrodes may be solid or liquid.

In one or more embodiments, the term "electrolyte" refers to a material and/or structure through which charges are carried by the movement of ions. Electrolytes may be any phase on the continuum of liquid to solid, including polymer gels, pastes, fused salts, ionic liquids, organic carbonates, or ionically conducting solids, such as sodium β-alumina, which has mobile sodium ions.

In one or more embodiments, metal-oxygen batteries (MOBs) may refer to a class of electrochemical cells in which, during discharging, oxygen is reduced at a positive electrode surface as part of the electrochemical cell reaction. Reduction of the oxygen forms an oxide or peroxide ion which reacts with a cationic metal species. Metal-oxygen batteries may be based upon Fe, Zn, Al, Mg, Ca, and Li.

MOBs, such as $Li^+$ based MOBs, have recently been demonstrated experimentally in a small number of laboratories. However, implementation of conventional MOBs has been largely unsuccessful because their performance, both in terms of capacity and power, has been unsatisfactory for vehicle applications. The limited performance is believed to be likely associated with incomplete or slow reactions involving the arrival and dissociation of oxygen molecules from the atmospheric air. In particular, for a metal oxygen battery to achieve its full discharge capacity, sufficient quantities of oxygen should be made available in a timely manner. In addition, since the rate of discharge is tied to the formation and growth of the cathode oxide, the battery's rate of discharge depends in part on the more rate limiting processes of oxygen dissociation.

It has been found, according to one or more embodiments of the present invention, that the MOB performance can be greatly improved by one or more of the following approaches: (1) providing a relatively high concentration of oxygen at the positive electrode; and/or (2) increasing oxygen diffusion rate at the positive electrode.

One or more of the following benefits can be realized according to certain embodiments of the present invention: (1) requirements for many balance of plant (BOP) components including positive electrode flow field, blower, and air purification system, can be reduced or eliminated; (2) susceptibility to contamination from atmospheric air impurities can be reduced or eliminated; (3) battery system flexibility may be increased and packaging costs can be reduced; (4) battery cell manufacturing procedures may be simplified; and/or (5) improved battery performance kinetics may be realized via a reduction in bulk diffusion and an increase in surface diffusion.

In one or more embodiments, the metal material M includes one or more elemental metal listed in the periodic table and/or one or more alloys formed of a mixture of two or more of the elemental metals. A non-limiting list of the elemental metals includes alkali metals, alkaline earth metals, transition metals and post-transition metals.

In certain instances such as during discharging, the first electrode 104a functions as a positive electrode or a cathode, and the second electrode 104b functions as a negative electrode or an anode. In certain other instances such as during charging, the first electrode 104a may function as a negative electrode or an anode, and the second electrode 104b may function as a positive electrode or a cathode. In these instances, the term "positive electrode" refers to an electrode with a positive polarity, and the term "negative electrode" refers to an electrode with a negative polarity.

Figures 2, 3:
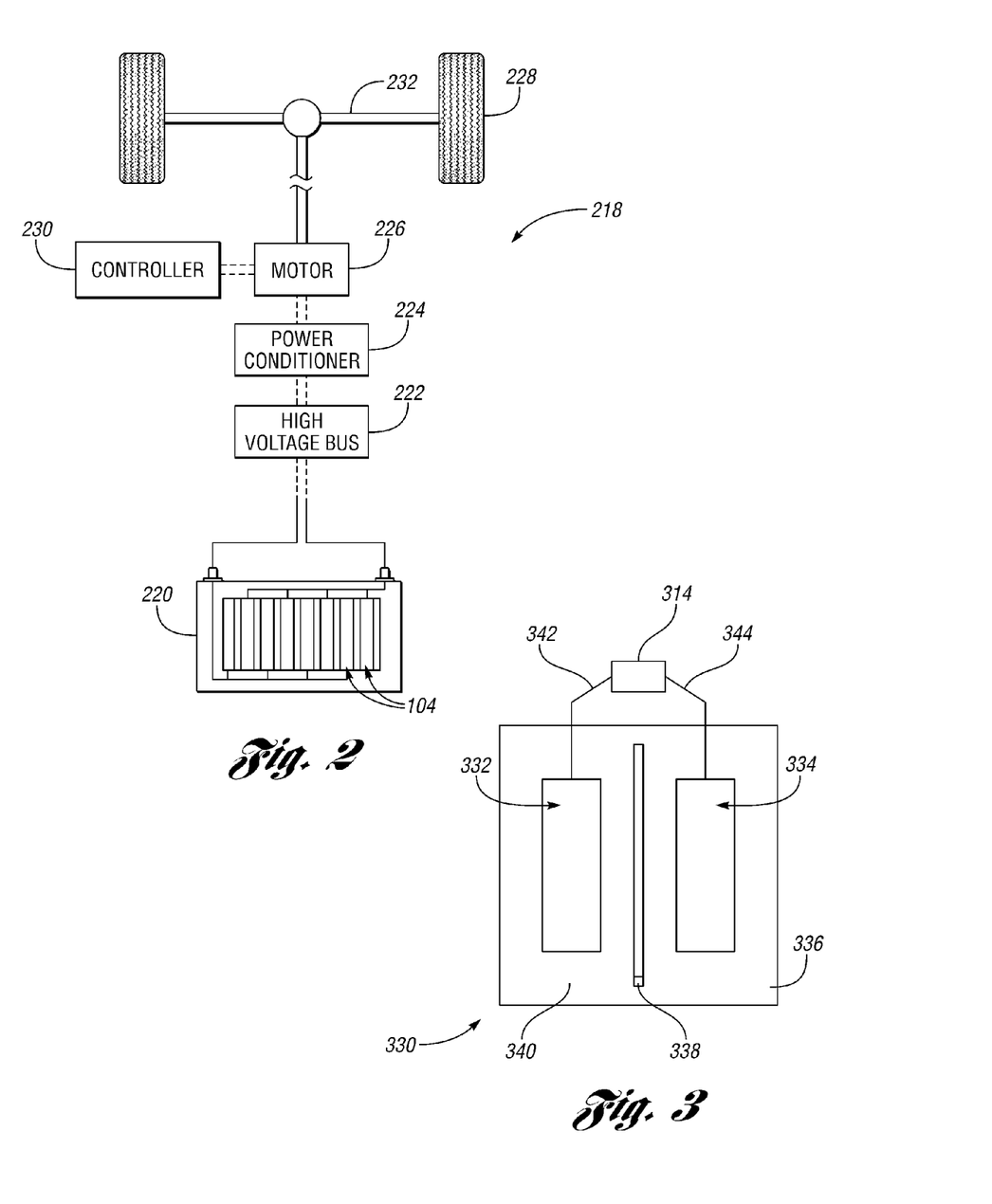
FIG. 2 illustrates a top view of an electric vehicle including a metal oxygen battery or a metal oxygen battery system according to yet another embodiment.
FIG. 3 schematically illustrates in cross-sectional view a battery cell according to yet another embodiment.

FIG. 2 illustrates a top view of an electric vehicle including a metal oxygen battery or a metal oxygen battery system according to another embodiment of the present invention. As illustratively depicted in FIG. 2, connected to vehicle 218 is a metal oxygen battery (MOB) system 220 electrically communicating directly or indirectly with a controller 230. In certain instances, the MOB or MOB system 220 is the metal oxygen battery 104 referenced in FIG. 1, the metal oxygen battery 330 referenced in FIG. 3, the metal oxygen battery 400 referenced in FIG. 4A, the metal oxygen battery 400b referenced in FIG. 4B, or the metal oxygen battery 500 referenced in FIG. 5B. The controller 130 electrically communicates with a traction motor 226. Traction motor 226 is connected to at least one wheel 228 of the vehicle 218. In certain instances, MOB battery system 220 electrically communicates with and provides energy to a high-voltage bus 222. High-voltage bus 222 electrically communicates with and provides energy to a power conditioner 224. The power conditioner 224 electrically communicates with the traction motor 226 which is connected directly or indirectly to wheel 228 situated on a frame 232.

In one or more embodiments, the MOB 104 is substantially free of water molecules and particularly liquid water molecules.

In one or more embodiments, the term "substantially free" refers to an extent of being less than 1000 parts per million (ppm), less than 500 ppm, less than 200 ppm, less than 100 ppm, or less than 50 ppm. In some instances means that a substance, such as water, is not purposefully added and whose presence, if any, is only incidental.

In yet another embodiment, the oxygen containment unit 102 includes relatively pure oxygen species in that any other gas or fluid species, such as nitrogen ($N_2$), is not present or only incidentally present at a nominal amount. This is in direct contrast to atmospheric air wherein nitrogen has a relatively significant presence relative to oxygen. In certain instances, when incidentally present, nitrogen is less than 1000 ppm, less than 500 ppm, less than 100 ppm, or less than 50 ppm.

As stated herein, one of the advantages of the present invention, in one or more embodiments, is that oxygen can be stored in the oxygen storage material 110 with a relatively high concentration and/or density as unusable or interfering gas molecules such as nitrogen can be effectively avoided. As a result, an oxygen material flow communicating between the MOB 104 and the OSM 110 can be effectively in a relatively how flow rate, which further reduces system costs associated with effecting and maintaining otherwise relatively high flow rate operations.

In one or more embodiments, the metal-oxygen battery cell is a closed-loop system with respect to material flow, but not to heat transfer or work. For instance, the metal-oxygen battery cell includes an oxygen positive electrode electrically communicating with a metal negative electrode through an electrolyte and a separator. The oxygen positive electrode includes an oxygen storage material which stores oxygen by the process of physiosorption, including adsorption, intercalation and clathratization processes. It should be appreciated that the oxygen positive electrode may further include a structural component in addition to the oxygen storage material, such as a carbon material. It is appreciated that the metal-oxygen battery positive electrode may further include a catalytic component, such as $Fe_2O_3$ and/or $CO_3O_4$; an ion conductive component, such as polyacrylonitrile and/or polyethylene oxide; and/or an electron conductive component including a conductive aid, such as amorphous carbon, graphitic carbon, graphene, and/or carbon nanotubes.

In one or more embodiments, the metal-oxygen battery cell undergoes reversible redox reactions. During the discharging reaction, the oxygen reacts with a metal cation from the metal negative electrode, forming a mixed oxide metal oxide, including a metal oxide and/or a metal peroxide which is then situated at the positive electrode. During the charging reaction, the metal mixed oxide metal oxide decomposes, releasing oxygen which, in at least one embodiment, is stored in a metal oxygen framework (MOF) composition at the positive electrode. The metal cation migrates back to the negative electrode reacquiring an electron from the negative electrode and forming a metal composition.

Oxygen storage materials (OSMs) may be utilized for oxygen by providing appreciable surface area for enhancing oxygen uptake. Desirable on-board operating conditions illustratively include near ambient temperature (T) (e.g., 150 K to 400 K) and modest pressure (P) (e.g., 1 to 100 bar) to avoid added cost or system complexity. Particularly suitable binding energies for oxygen material storage may be determined based on the Clausius-Claeypron Equation of the form:

$$\ln P = \frac{-\Delta H}{R} \frac{1}{T}$$

where P is the partial pressure of oxygen, $\Delta H$ is the sorbent oxygen binding energy, R is a constant, and T is the temperature in degrees Kelvin of the oxygen. In certain other instances, the OSM has an oxygen binding energy, or particularly an isosteric adsorption enthalpy, ranging from 5 kJ/mol·$O_2$ to 100 kJ/mol·$O_2$, or 7 kJ/mol·$O_2$ to 70 kJ/mol·$O_2$, or to 10 kJ/mol·$O_2$ to 40 kJ/mol·$O_2$.

In one or more embodiments, OSMs may be utilized as oxygen storage materials for oxygen in terms of having relatively high material density. The volumetric storage capacity of an OSM may be related to the gravimetric capacity and material density for the OSM. As a non-limiting example, if a given OSM has a gravimetric capacity of 0.3 kg of oxygen per kg and a materials density of 0.2 g/mL, a corresponding volumetric capacity would be 60 g of oxygen per liter of OSM. Storing 8 kg of oxygen would use 133 liters of OSM. However, if the material density is 1 g/mL, only 27 liters of OSM would be required.

Without being limited to any particular theory, it is appreciated that the OSMs are generally provided with a relatively high-surface area, which facilitates oxygen uptake or adsorption by processes such as physiosorption. Such oxygen uptake scales linearly with surface area as measured using any suitable method such as the BET method. In certain instances, the surface area of the OSM exceeds 1000 $m^2$/g, from 2000 $m^2$/g to 8000 $m^2$/g, or from 3000 $m^2$/g to 6000 $m^2$/g.

In one or more embodiments, it is appreciated that oxygen molecules as described herein may include oxygen species other than oxygen, such as diatomic oxygen, ozone, and free radical oxygen species.

In certain instances, the OSM in the excess capacity has a gravimetric capacity for oxygen of greater than 10 grams per 100 grams of the OSM, or of between 20 to 80 grams per 100 grams of the OSM, or 25 to 50 grams oxygen per 100 grams of the OSM.

In certain other instances, the OSM has a material (single crystal) density greater than 0.1 g/mL, or of from 0.25 g/mL to 5 g/mL, or of from 0.5 g/mL to 2 g/mL. In certain other instances, the OSM has a volumetric capacity for oxygen of greater than 2 g/L, or of from 16 g/L to 500 g/L, of or 32 g/L of to 300 g/L, or of from 50 g/L to 220 g/L.

In one or more embodiments to achieve one or more of the properties discussed above, the OSMs are porous, high surface area sorbent materials. Non-limiting examples of the OSMs include crystalline framework-like compounds such as metal-organic frameworks (MOFs), covalent organic frameworks (COFs), zeolitic imidazolate frameworks (ZIFs) and zeolitic materials; aerogel-like substances with nanometer or micrometer scale porosity, such as zero-gels and xerogels; porous carbon materials such as porous carbon gels and porous carbon nanotubes; and porous metal substances such as porous metal oxides, porous metal carbides, porous metal nitride or other porous metal substances with internal sites that favorably form weak physical adsorption sites with oxygen.

Non-limiting examples of the MOFs include: a catalytically-active MOF-5 having embedded metal, such as Ag@[$Zn_4O(BDC)_3$], Pt@[$Zn_4O(BDC)_3$], Cu@[$Zn_4O(BDC)_3$], and Pd@[$Zn_4O(BDC)_3$]; an organically solvated MOF, such as Ti($O^iPr$)$_4$[$Cd_3Cl_6(LI)_3$·4DMF·6MeOH·3$H_2O$, Ti($O^iPr$)$_4$[$Cd_3(NO_3)_6(LI)_4$·7MeOH·5$H_2O$, Ti($O^iPr$)$_4$[Cd(LI)$_2$($H_2O$)$_2$][$ClO_4$]$_2$·DMF·4MeOH·3$H_2O$, [$Rh_2(M^{2+}TCPP)_2$], where $M^{2+}$ may include Cu, Ni, or Pd, and [$Zn_2(BPDC)_2(L2)$]·10DMF·8$H_2O$; an ionically or partially ionically solvated MOF, such as [Ni(L-aspartate)bpy$_{0.5}$]HCl$_{0.9}$MeOH$_{0.5}$, [Cu(L-aspartate)bpy$_{0.5}$]HCl, [Cu(D-aspartate)bpy$_{0.5}$]HCl, [Cu(L-aspartate)bpy$_{0.5}$]HCl, [Cu(D-aspartate)bpy$_{0.5}$]HCl, Cr$_3$(F,OH)(en)$_2$O(BDC)$_3$(ED-MIL-101), Cr$_3$(F,OH)(en)$_2$O(BDC)$_3$ (ED-MIL-101), [$Zn_3O(L3-H)$]·($H_3O$)$_2$($H_2O$)$_{12}$(D-POST-1), [Sm(L4-$H_2$)(L4-$H_3$)($H_2O$)$_4$]·($H_2O$)$_x$, [Cu(bpy)($H_2O$)$_2$(BF$_4$)(bPY)], [$Zn_4O(BDC)_3$](MOF-5), [Ln(OH)$H_2O$)(naphthalenedisulfonate)] where Ln includes a lanthanide metal such as Nd, Pr, or La; as well as [In$_4$(OH)$_6$(BDC)$_3$], [Cu$_3$(BTC)$_2$], [Sc$_2$(BDC)$_3$], [Sc$_2$(BDC)$_{2.5}$(OH)], [Y$_2$(BDC)$_3$($H_2O$)$_2$]·$H_2O$, [La$_2$(BDC)$_3$($H_2O$)$_2$]·$H_2O$. [Pd(2-pymo)$_2$], [Rh$_2$(H2TCPP)$_2$)BF$_4$, [Cu$_2$(trans-1,4 cyclohexanedicarboxylate)$_2$]$H_2O$, [Cu(2-pymo)$_2$], [Co(PhIM)$_2$], [In$_2$(BDC)$_3$(bPY)$_2$], [In$_2$(BDC)$_2$(OH)$_2$(phen)$_2$], [In(BTC)(H$_2$O)(bpy)], [In(BTC)(H$_2$O)(phen)], [Sc$_2$(BDC)$_{2.5}$(OH)], [Y$_2$(BDC)$_3$(H$_2$O)$_2$]·H$_2$O, [La$_2$(BDC)$_3$(H$_2$O)$_2$]H$_2$O, [Cu$_3$(BTC)$_2$], [Cd(4,4'-bpy)$_2$(H$_2$O)$_2$]·(NO$_3$)$_2$·(H$_2$O)$_4$, [Sm(L4-H$_2$)(L4-H$_3$)(H$_2$O)$_4$]·(H$_2$O)$_x$, Mn$_3$[(Mn$_4$Cl)(BTT)$_8$(MeOH)$_{10}$]$_2$, [Zn$_4$O(BDC)$_3$](MOF-5), Ti-(2,7-dihydroxynaphthalene)-MOF, [Pd(2-pymo)$_2$], [Cu$_3$(BTC)$_2$], [Cu$_3$(BTC)$_2$], [Cu$_3$(BTC)$_2$], [Rh$_2$(L5)], [Rh(BDC)], [Rh (fumarate)], [Ru(1,4-diisocyanobenzene)$_2$]Cl$_2$, [In$_4$(OH)$_6$(BDC)$_3$], [Ru$_2$(BDC)$_2$], [Ru$_2$(BPDC)$_2$], [Ru$_2$(BDC)$_2$(dabco)], [Ru$_2$(BPDC)$_2$(dabco)], [Rh$_2$(fumarate)$_2$], [Rh$_2$(BDC)$_2$], [Rh$_2$(H$_2$TCPP)$_2$], and [Pd(2-pymo)$_2$].

In one or more embodiments, the MOF is a porous coordination network (PCN) having at least one entactic metal center (EMC), such as PCN-9 MOF. The EMC is an unusual geometry imposed by a ligand on a metal center in the MOF for the purpose of enhancing the MOF's affinity for oxygen. Non-limiting examples of imposed geometry include adapting organic positive electrode units to generate a pore comparable to the size of the oxygen molecule and introducing a coordinatively unsaturated metal center, such as a metal cation cluster. A combination of several EMCs may create a secondary building unit (SBU) within the MOF suitable for exceptional gas sorption affinity as determined by adsorption isotherms collected at various temperatures and fitted using the Langmuir-Fruendlich equation.

When applied as an example of the OSM, and in certain instances, PCN-9 may be provided with an oxygen adsorption enthalpy greater than 12 kJ/mol·$O_2$, ranging from 15 kJ/mol·$O_2$ to 45 kJ/mol·$O_2$, from 17 kJ/mol·$O_2$ to 43 kJ/mol·$O_2$, or 18 kJ/mol·$O_2$ to 23 kJ/mol·$O_2$. PCN-9 has a fixed pore diameter ranging from 0.55 nm to 0.75 nm or 0.6 nm to 0.7 nm.

In certain instances, the MOF includes a solvated MOF formed from 1,4-benzenedicarboxylic acid (BDC) with a zinc metal cation cluster. A non-limiting example of the solvated MOF is $Zn_4$ (μ-4O) (μ-BDC)$_3$·(DEF)$_7$, where DEF is diethylformamide, a solvent molecule.

Turning now to FIG. 3, a battery cell 330 is schematically illustrated in cross-sectional view according to at least one embodiment. A first electrode 332 electrically communicates with a second electrode 334. The first electrode 332 and second electrode 334 are situated in a housing 336. Housing 336 defines a closed container allowing no transfer of material, oxygen in particular, to and from the ambient environment, but allows heat and work to be transferred.

A separator 338 may be situated between the first electrode 332 and the second electrode 334. In this configuration, the first electrode 332, the second electrode 334, and the separator 338 are contained within the housing 336 and are at least partially in contact with an electrolyte 340. In certain particular instances, the electrolyte 340 is non-aqueous.

Conduit 342 extends from housing 336 and electrically communicates with first electrode 332. Conduit 344 also extends from housing 336 and electrically communicates with electrode 334. Conduits 342 and 344 electrically communicate with high voltage bus 222 to allow electrons to flow between the first electrode 332 and second electrode 334 when the circuit 314 is in a closed operating state.

Figures 4A, 4B:
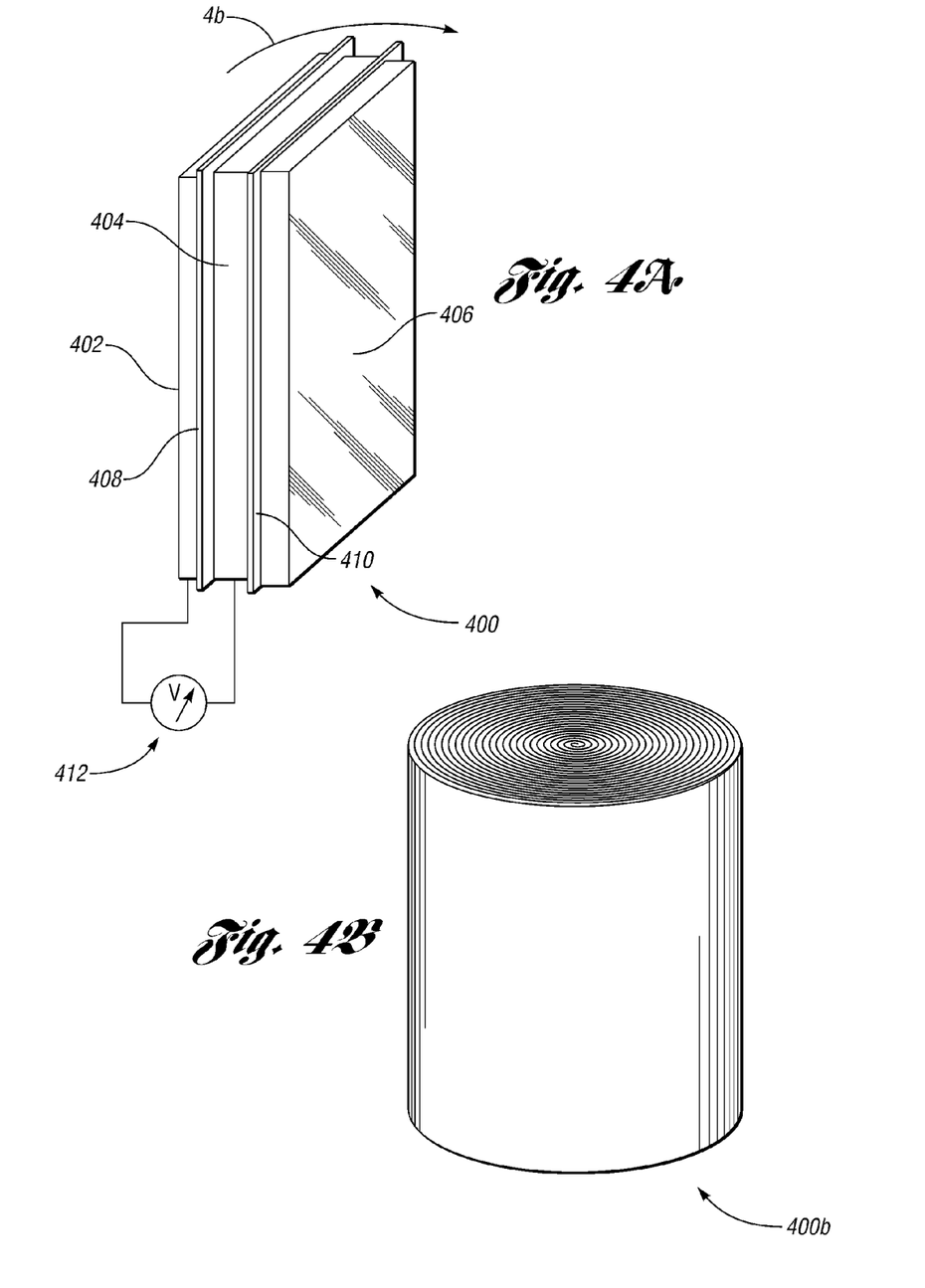
FIG. 4A depicts a partial cross-sectional view of a metal oxygen battery cell according to yet another embodiment.
FIG. 4B depicts a perspective view of the metal oxygen battery cell of FIG. 3A in a spiral wound cell configuration.

FIG. 4A depicts layer-to-layer configuration of a metal oxygen battery according to yet another embodiment. A metal oxygen battery is generally shown at 400. The metal oxygen battery 400 includes a first electrode 402, a second electrode 404, and an oxygen storage material 406. A separator 408 separates the first electrode 402 and the second electrode 404. As depicted in FIG. 4A, the OSM 406 is disposed alongside and is separated from the second electrode 404 via a selective transport member 410. The selective transport member 410 may be oxygen permeable and electrolyte impermeable. It is appreciated that the use of the selective transport member 410 may not be necessary if the OSM 406 is so chosen that contamination of the OSM 406 by certain battery components such as electrolytes can be minimized or eliminated. Additionally, an external load 412 completes the electric energy generation loop by connecting the first electrode 402 and the second electrode 404.

A sheet of the layer-to-layer battery cell 400 can be rolled in the direction of 4b to form a spiral-wound cell.

Figure 5A:
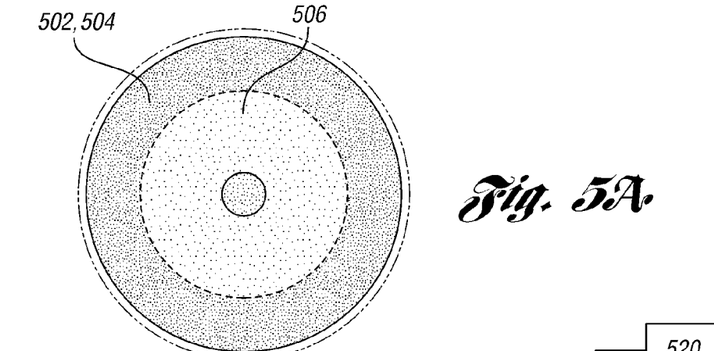
FIGS. 5A, 5B, and 5C show a plan view, a perspective view, and a cross-sectional view along line $5c$-$5c$ of a metal oxygen battery cell according to yet another embodiment.
Figure 5B:
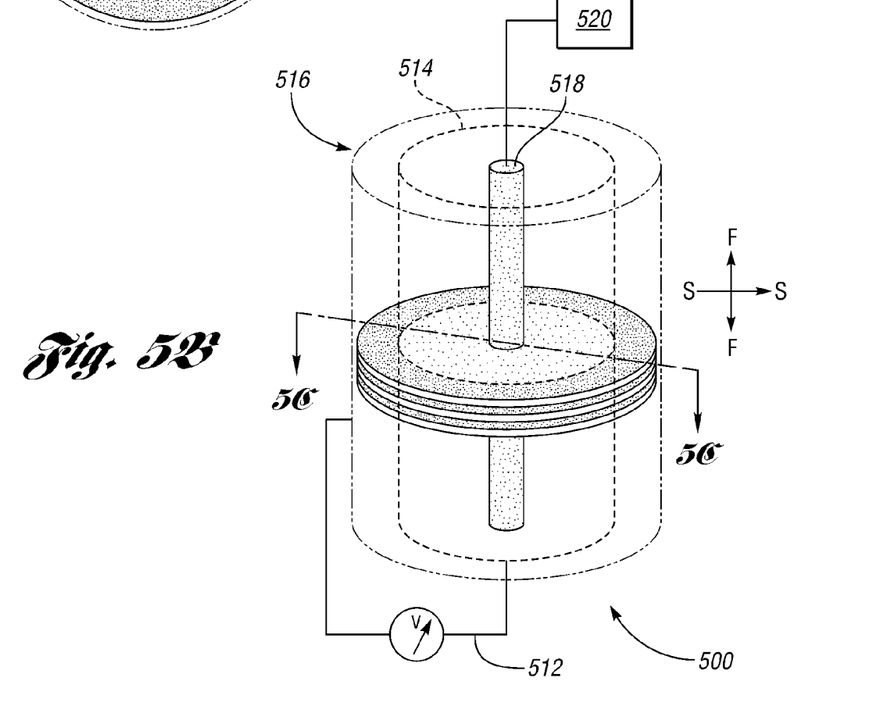
Figure 5C:
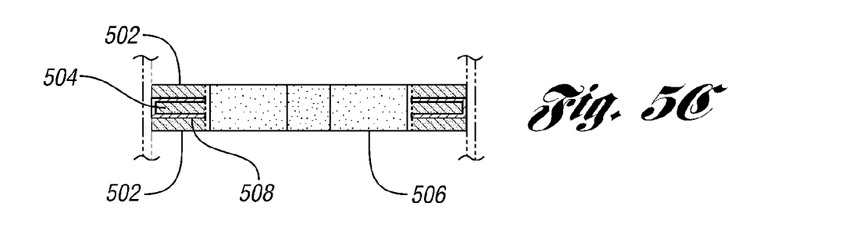

FIGS. 5A, 5B, and 5C depict different views of a metal oxygen battery according to another embodiment. FIG. 5A depicts a plan view of a metal oxygen battery generally shown at 500. FIG. 5B depicts a perspective view of the metal oxygen battery 500 of FIG. 5A. FIG. 5C depicts a cross-sectional of the metal oxygen battery 500 of FIG. 5A taken along the line 5c-5c. The metal oxygen battery 500 includes one or more first electrodes 502, one or more second electrodes 504, one or more separators 508 separating an adjacent pair of the first and second electrodes 502, 504. An external circuit 512 completes the electric energy generation loop by connecting a pair of current collectors 514, 516. The one or more second electrodes 504 are in oxygen communication with the OSM 506. The OSM 506 is optionally separated from the one or more second electrodes 504 through a selective transport member 508. The selective transport member is oxygen permeable and electrolyte impermeable. In certain instances, and as depicted in FIGS. 5A to 5C, the first and second electrodes 502, 504 may be positioned side-by-side in a first direction FF, the oxygen storage material 506 and the first electrode 502 are positioned side-by-side in a second direction SS different from the first direction FF. In certain other instances, and as depicted in FIGS. 5A to 5C, oxygen adsorption to and desorption from OSM 506 may be facilitated by a temperature modifying device 518 which is under a temperature control unit 520. For instance, during battery discharging, the temperature modifying device 518 may be controlled to provide an elevated temperature for assisting oxygen release from the OSM 506 to enhance the discharging reactions Likewise during battery recharging, the temperature modifying device 516 may be controlled to provide a relatively cooler temperature for assisting oxygen absorption.

In one more embodiments, the selective transport member 410, 510 is oxygen permeable. Without being limited to any particular theory, it is believed that oxygen permeability may be a function of many variables. The variables may include thickness of the selective transport member 410, 510, radius of the OSM particles or spheres, system operating pressure and temperature, system energy output requirement. In certain instances, at least 85 percent, 90 percent, or 95 percent by weight of the surrounding oxygen species can freely enter into and exit from the selective transport member 410, 510 without resistance.

In certain other instances, the selective transport member 410, 510 is electrolyte impermeable. Without being limited to any particular theory, it is believed that electrolyte impermeability may be a function of many variables. The variables may include thickness of the selective transport member 410, 510, radius of the OSM particles or spheres, system operating pressure and temperature, and system energy output requirement. In certain instances, at least 85 percent, 90 percent, or 95 percent by weight of the surrounding electrolyte molecules and species are blocked from entering into the selective transport member 410, 510. In certain particular instances, the OSM particles as defined by the selective transport member 410, 510 are completely devoid of any electrolyte molecules or species thereof and any presence of the latter would be incidental.

In certain instances, the selective transport member 410, 510 is optionally configured as an oxygen permeable and electrode impermeable membrane.

In certain other instances, the OSM has a material (single crystal) density greater than 0.1 g/mL, or of from 0.25 g/mL to 5 g/mL, or of from 0.5 g/mL to 2 g/mL.

An example of a manufacturing process for certain MOFs, such as the MOF-5, includes the steps of mixing a solution of terephthalic acid with a zinc salt, such as zinc nitrate to form a mixture. The mixture is crystallized or precipitated at a temperature ranging from 25° C. to 200° C. The precipitate is filtered from the solution and dried. It is appreciated that MOFs may be modified after synthesis via reactions such as oxidation, acetylization, hydrogenation, Knoevenagel condensation, and/or Heck coupling. Moreover, the MOFs may be activated by removing the solvent introduced during a crystallization and/or precipitation process.

In one or more embodiments, the second electrode 104b, which functions as an anode during discharging, includes a metal material (M). The metal material M may include a metal, such as an alkali metal, an alkaline-earth metal, or a transition metal. The metal material M may also include alloys of such metals, metal ceramics, superalloys, fusible alloys, metal intercalation compounds or materials, and amalgams. In certain particular instances, the metal material M includes an elemental monolith negative electrode, including, for example, Li or Na; a mixed material negative electrode, having an intercalation compound, such as graphite; and/or an alloy, such as a lithium-silicon alloy, a lithium aluminum alloy, and/or a lithium boron alloy.

In certain particular instances, the second electrode 104b is formed of elemental lithium metal. In certain other particular instances, the second electrode 104b includes an alloy of lithium.

In one or more embodiments, the separator has sufficient thickness and/or pore size such that the electrolyte and/or cations are effectively excluded from migrating to the first electrode.

An operating state, in at least one embodiment, includes a discharging operating state, in which oxidation occurs at the second electrode to produce electrons. A non-limiting example of a half-cell reaction at the second electrode during the discharging operating state is shown in [1]

$$Li \rightarrow Li^+ + e^-$$ [1]

where the Li metal is included in the second electrode and the Li cation migrates through the electrolyte to the first electrode. At the first electrode, the Li cation reacts with oxygen to form the mixed oxide metal oxide as shown in [2]

$$Li^+ + xO_2 + 2xe^- \rightarrow LiOx$$ [2]

where the electrons generated at the second electrode in [1] flow to the first electrode through a load circuit, such as high voltage bus 222, and where LiOx may be the mixed oxide metal oxide which may include stoichiometric metal oxides such as $Li_2O_2$, a lithium peroxide and $Li_2O$, a lithium oxide. It is appreciated that non-stoichiometric metal oxides may be intermixed with the stoichiometric metal oxides or comprise the entire mixed oxide metal oxide, especially after at least greater than 118 charging-discharging cycles have occurred. A non-limiting example of the non-stoichiometric metal oxide may include a dendritic mixed oxide metal oxide solid that forms at the second electrode. While not wishing to be tied to any one theory, the formation of such irregular mixed oxide metal oxide solids, such as the dendritic mixed oxide metal oxide may be one cause of the long-term degradation of the effectiveness of being able to recharge the MOB.

At the second electrode during the charging operating state, following the above embodiment and non-limiting example, reduction occurs as the lithium cation is reduced to lithium metal at the second electrode. The exemplary half-cell reaction is shown in [3]

$$Li^+ + e^- \rightarrow Li$$ [3]

At the first electrode during the charging operating state, oxidation occurs, producing electrons and decomposing the mixed oxide metal oxide solid to release oxygen. A non-limiting example of a half-cell reaction at the first electrode during the charging operating state is shown in [4]

$$LiOx \rightarrow Li^+ + \frac{x}{2}O_2 + e^-$$ [4]

The oxygen is stored in an oxygen containment unit including the OSM when the oxygen is contained by physiosorption intercalation, and/or clathratization. The OSM may be situated in an external storage device, permitting isolation of the OSM from the first electrode; adjacent to the first electrode; and/or in intimate contact with the first electrode, which substantially minimizes the diffusion distance for the oxygen until reaction with the first electrode occurs during the discharging operating state. Reducing the diffusion distance increases the responsiveness to electron flow rates as the demand on the load circuit, e.g., directly or indirectly the demand of the traction motor, changes during operation time periods of the vehicle.

In at least one embodiment, the available oxygen for the battery cell is less than the oxygen uptake at the materials level. In another embodiment, the available oxygen for the battery cell ranges from 10% to 70% of the oxygen uptake at the materials level.

In at least one embodiment, the average diffusion distance from the point of the OSM where oxygen is released to the point at or near the first electrode where the oxygen is reacted to is from 1 nm to 5 cm, 1 nm to 1 cm, or 1 nm, to 0.1 cm.

In at least on embodiment, a method of operating a battery system in a vehicle includes the step of inputting oxygen into a reversible closed-loop conduit from the metal oxygen battery (MOB). The MOB has the oxygen containment unit internal to the MOB. The oxygen containment unit includes the OSM. The method also includes the step of outputting oxygen to the OSM from the reversible closed-loop conduit. The OSM is encapsulated in an electrolyte-impermeable membrane. It is understood that the membrane may also be an oxygen-permeable, electrolyte-impermeable membrane.

The following applications disclose and claim battery systems that may be related to the battery system disclosed and claimed herein: U.S. patent application Ser. Nos. 12/828,380, 12/828,399, 12/828,386, 12/828,396, and 12/828,392, all filed on Jul. 1, 2010. Each of the identified applications is incorporated herein by reference in their entirety.

While the best mode for carrying out the invention has been described in detail, those familiar with the art to which this invention relates will recognize various alternative designs and embodiments for practicing the invention as defined by the following claims.

What is claimed:

1. A battery system comprising:
a metal oxygen battery including a first electrode layer, an oxygen storage material (OSM) layer, and a selective transport layer situated between and spacing apart the first electrode and the OSM layers, such that the first electrode layer, the OSM layer and the selective transport layer are in a layer-to-layer configuration.

2. The battery system of claim 1, further comprising a second electrode including a metal material (M).

3. The battery system of claim 1, wherein the selective transport layer is an oxygen-permeable membrane.

4. The battery system of claim 1, wherein the oxygen storage material is internal to the metal oxygen battery.

5. The battery system of claim 3, wherein the oxygen storage material and the oxygen permeable membrane collectively define an oxygen containment unit.

6. The battery system of claim 5, wherein the metal oxygen battery and the oxygen containment unit are in a closed-loop relationship with each other.

7. The battery system of claim 1, wherein the oxygen storage material has an oxygen volumetric capacity greater than 2 grams of oxygen per liter of the oxygen storage material.

8. The battery system of claim 1, wherein, during a first operating state, the first electrode is a cathode.

9. The battery system of claim 1, wherein, during a second operating state, the first electrode is an anode.

10. The battery system of claim 1, wherein the oxygen storage material has a first operating state of oxygen adsorption into the oxygen storage material.

11. The battery system of claim 1, wherein the oxygen storage material has a second operating state of oxygen desorption from the oxygen storage material.

12. The battery system of claim 1, wherein the oxygen storage material has a first operating state of oxygen adsorption into the oxygen storage material and a second operating state of oxygen desorption from the oxygen storage material, wherein the battery system is capable of switching from the first operating state to the second operating state.

13. The battery system of claim 1, further comprising a control module controlling an oxygen flow between the oxygen storage material and the metal oxygen battery.

14. The battery system of claim 13, wherein the metal oxygen battery, the control module, and the oxygen storage material are in a closed-loop relative to each other.

15. The battery system of claim 1, wherein the oxygen storage material includes a metal oxygen framework (MOF).

16. The battery system of claim 1, further comprising a temperature modifying device in communication with the oxygen storage material.

17. The battery system of claim 1, further comprising an electrolyte, the selective transport layer is an oxygen-permeable, electrolyte-impermeable membrane.

18. A battery system comprising:
a metal oxygen battery including a first electrode layer, an oxygen storage material layer, a selective transport layer situated between and spacing apart the first electrode and the oxygen storage material layers, such that the first electrode layer, the oxygen storage material layer and the selective transport layer are in a layer-to-layer configuration, the oxygen storage material layer being in oxygen communication with the first electrode.

19. A method of operating a metal oxygen battery including a first electrode layer, an oxygen storage material layer, a selective transport layer situated between and spacing apart the first electrode and the oxygen storage material layers, such that the first electrode layer, the oxygen storage material layer and the selective transport layer are in a layer-to-layer configuration, comprising the steps of:
communicating oxygen between the first electrode layer and the oxygen storage material layer through the selective transport layer situated there between.

20. The battery system of claim 2, wherein the first and second electrodes are positioned side-by-side in a first direction, the oxygen storage material and the first electrode are positioned side-by-side in a second direction different from the first direction.

* * * * *